United States Patent
Vitthaladevuni et al.

(10) Patent No.: US 10,819,482 B2
(45) Date of Patent: Oct. 27, 2020

(54) SOUNDING REFERENCE SIGNAL ENHANCEMENTS

(71) Applicant: QUALCOMM Incorporated, San Diego, CA (US)

(72) Inventors: Pavan Kumar Vitthaladevuni, San Diego, CA (US); Jing Jiang, San Diego, CA (US); Alexandros Manolakos, San Diego, CA (US); Tingfang Ji, San Diego, CA (US); Joseph Binamira Soriaga, San Diego, CA (US); June Namgoong, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/683,491

(22) Filed: Aug. 22, 2017

(65) Prior Publication Data

US 2018/0062810 A1    Mar. 1, 2018

Related U.S. Application Data

(60) Provisional application No. 62/379,007, filed on Aug. 24, 2016.

(51) Int. Cl.
*H04L 5/00* (2006.01)
*H04W 52/24* (2009.01)
(Continued)

(52) U.S. Cl.
CPC .......... *H04L 5/0048* (2013.01); *G01S 5/0018* (2013.01); *H04L 5/0037* (2013.01);
(Continued)

(58) Field of Classification Search
CPC ... H04L 5/0048; H04L 5/0069; H04L 5/0094; H04L 5/0085; H04L 5/0051;
(Continued)

(56) References Cited

U.S. PATENT DOCUMENTS 9,686,788 B2 * 6/2017 Chen ................. H04W 72/0446
2010/0254292 A1 * 10/2010 Kim ..................... H04W 52/343
370/311

(Continued)

FOREIGN PATENT DOCUMENTS

| WO | 2014019213 A1 | 2/2014 | |
| WO | WO-2014019213 A1 * | 2/2014 | ........ H04W 72/0446 |
| WO | 2016036158 A1 | 3/2016 | |

OTHER PUBLICATIONS

NPL: Mitigation of Sounding Pilot Contamination in Massive MIMO systems; Taeseop etlal. Seoul, Korea. IEEE ICC 2014. (Year: 2014).*

(Continued)

*Primary Examiner* — Hassan A Phillips
*Assistant Examiner* — Mohammed S Chowdhury
(74) *Attorney, Agent, or Firm* — Patterson+ Sheridan, L.L.P.

(57) ABSTRACT

Aspects of the present disclosure provide methods and apparatuses for sounding reference signal (SRS) enhancements. An exemplary method performed by a user equipment generally includes receiving information indicating a symbol, in a sub-frame of a radio frame used to communicate in the wireless network, for transmission of sounding reference signals (SRSs), wherein a location of the symbol in the sub-frame is based, at least in part, on a location of the UE and transmitting a SRS in the symbol based on the received information.

28 Claims, 12 Drawing Sheets

(51) Int. Cl.
| | |
|---|---|
| *H04W 52/32* | (2009.01) |
| *H04W 52/14* | (2009.01) |
| *G01S 5/00* | (2006.01) |
| *H04W 72/04* | (2009.01) |
| *H04W 72/08* | (2009.01) |
| *H04L 5/14* | (2006.01) |
| *H04B 17/27* | (2015.01) |
| *H04B 7/0413* | (2017.01) |
| *H04W 88/02* | (2009.01) |

(52) U.S. Cl.
CPC .......... *H04L 5/0051* (2013.01); *H04L 5/0069* (2013.01); *H04L 5/0085* (2013.01); *H04L 5/0094* (2013.01); *H04W 52/146* (2013.01); *H04W 52/247* (2013.01); *H04W 52/248* (2013.01); *H04W 52/325* (2013.01); *H04W 72/0446* (2013.01); *H04W 72/0473* (2013.01); *H04W 72/085* (2013.01); *H04B 7/0413* (2013.01); *H04B 17/27* (2015.01); *H04L 5/0007* (2013.01); *H04L 5/1469* (2013.01); *H04W 88/02* (2013.01)

(58) Field of Classification Search
CPC ................ H04L 5/1469; H04L 5/0007; H04L 2025/03783; H04L 2025/03796; H04L 27/261; H04L 27/2613; H04L 27/2675; H04L 27/3455; H04W 52/325; H04W 52/248; H04W 52/247; H04W 52/146; H04W 72/0446; H04W 72/0473; H04W 72/085; H04W 88/02; H04W 40/244; H04W 52/226; H04B 7/0413; G01S 5/0018

USPC ........................................................ 370/329
See application file for complete search history.

(56) References Cited

U.S. PATENT DOCUMENTS

| | | | | |
|---|---|---|---|---|
| 2012/0202558 | A1* | 8/2012 | Hedberg | H04L 5/0058 455/550.1 |
| 2014/0064247 | A1* | 3/2014 | Teyeb | H04W 36/0083 370/331 |
| 2016/0278050 | A1* | 9/2016 | Nory | H04W 16/14 |
| 2016/0330698 | A1* | 11/2016 | Loehr | H04W 4/70 |
| 2017/0279505 | A1* | 9/2017 | Zhang | H04B 7/26 |
| 2017/0288834 | A1* | 10/2017 | Yuan | H04L 5/0026 |
| 2019/0074883 | A1* | 3/2019 | Park | H04W 24/10 |

OTHER PUBLICATIONS

Mitigation of Sounding Pilot Contamination in Massive MIMO System, Lee et al., IEEE ICC 2014 as submitted in IDS. (Year: 2014).*

International Search Report and Written Opinion—PCT/US2017/048206—ISA/EPO —dated Nov. 17, 2017.

Taeseop L., et al., "Mitigation of Sounding Pilot Contamination in Massive MIMO Systems", IEEE International Conference on Communications, Jun. 10, 2014, XP032632706, pp. 1191-1196.

Vook F.W., et al., "IEEE 802.16 Broadband Wireless Access Working Group: Signaling Methodologies to Support Closed-Loop Transmit Processing in TDD-OFDMA", IEEE 802.16 Broadband Wireless Access Working G, vol. C802-16e, No. 4/103, Jul. 7, 2004 (Jul. 7, 2004), XP008117747, pp. 1-22.

* cited by examiner

SOUNDING REFERENCE SIGNAL ENHANCEMENTS

CLAIM OF PRIORITY UNDER 35 U.S.C. § 119

This application claims benefit of U.S. Provisional Patent Application Ser. No. 62/379,007, filed Aug. 24, 2016, which is herein incorporated by reference in its entirety.

FIELD OF THE DISCLOSURE

Aspects of the present disclosure related generally to wireless communications systems, and more particularly, to methods and apparatus for sounding reference signal (SRS) enhancements.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus for determining/transmitting SRSs in different symbols of a subframe, for example, based on a location of a UE transmitting the SRS are described herein.

In an aspect, a method for wireless communications is provided. The method may be performed, for example, by a base station (BS). The method generally includes determining a first symbol, in a sub-frame of a radio frame used to communicate in the wireless network, for transmission of sounding reference signals (SRSs) by a first group of UEs, wherein the determination of the first symbol is based, at least in part, on a location of each UE in the first group of UEs, determining a second symbol, in the sub-frame, for transmission of SRSs by a second group of UEs, wherein the determination of the second symbol is based, at least in part, on a location of each UE in the second group of UEs, and transmitting information to the first group of UEs and the second group of UEs indicating a location of the first symbol and the second symbol in the sub-frame.

In an aspect, an apparatus for wireless communications by a base station (BS) is provided. The apparatus generally includes at least one processor configured to determine a first symbol, in a sub-frame of a radio frame used to communicate in the wireless network, for transmission of sounding reference signals (SRSs) by a first group of UEs, wherein the determination of the first symbol is based, at least in part, on a location of each UE in the first group of UEs, determine a second symbol, in the sub-frame, for transmission of SRSs by a second group of UEs, wherein the determination of the second symbol is based, at least in part, on a location of each UE in the second group of UEs, and transmit information to the first group of UEs and the second group of UEs indicating a location of the first symbol and the second symbol in the sub-frame. The apparatus also generally includes a memory coupled with the at least one processor.

In an aspect, an apparatus for wireless communications by a base station (BS) is provided. The apparatus generally includes means for determining a first symbol, in a sub-frame of a radio frame used to communicate in the wireless network, for transmission of sounding reference signals (SRSs) by a first group of UEs, wherein the determination of the first symbol is based, at least in part, on a location of each UE in the first group of UEs, means for determining a second symbol, in the sub-frame, for transmission of SRSs by a second group of UEs, wherein the determination of the second symbol is based, at least in part, on a location of each UE in the second group of UEs, and means for transmitting information to the first group of UEs and the second group of UEs indicating a location of the first symbol and the second symbol in the sub-frame.

In an aspect, a non-transitory computer-readable for wireless communications by a base station (BS) is provided. The non-transitory computer-readable generally includes instructions for determining a first symbol, in a sub-frame of a radio frame used to communicate in the wireless network, for transmission of sounding reference signals (SRSs) by a first group of UEs, wherein the determination of the first symbol is based, at least in part, on a location of each UE in the first group of UEs, determining a second symbol, in the sub-frame, for transmission of SRSs by a second group of UEs, wherein the determination of the second symbol is based, at least in part, on a location of each UE in the second group of UEs, and transmitting information to the first group of UEs and the second group of UEs indicating a location of the first symbol and the second symbol in the sub-frame.

In an aspect, a method for wireless communications is provided. The method may be performed, for example, by a user equipment (UE). The method generally includes receiving information indicating a symbol, in a sub-frame of a radio frame used to communicate in the wireless network, for transmission of sounding reference signals (SRSs), wherein a location of the symbol in the sub-frame is based, at least in part, on a location of the UE and transmitting a SRS in the symbol based on the received information.

In an aspect, an apparatus for wireless communications by a user equipment (UE) is provided. The apparatus generally includes at least one processor configured to receive information indicating a symbol, in a sub-frame of a radio frame used to communicate in the wireless network, for transmission of sounding reference signals (SRSs), wherein a location of the symbol in the sub-frame is based, at least in part, on a location of the UE and transmit a SRS in the symbol based on the received information. The apparatus also generally includes a memory coupled with the at least one processor.

In an aspect, an apparatus for wireless communications by a user equipment (UE) is provided. The apparatus generally includes means for receiving information indicating a symbol, in a sub-frame of a radio frame used to communicate in the wireless network, for transmission of sounding reference signals (SRSs), wherein a location of the symbol in the sub-frame is based, at least in part, on a location of the UE and means for transmitting a SRS in the symbol based on the received information.

In an aspect, a non-transitory computer-readable medium for wireless communications by a user equipment (UE) is provided. The non-transitory computer-readable medium generally includes instructions for receiving information indicating a symbol, in a sub-frame of a radio frame used to communicate in the wireless network, for transmission of sounding reference signals (SRSs), wherein a location of the symbol in the sub-frame is based, at least in part, on a location of the UE and transmitting a SRS in the symbol based on the received information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
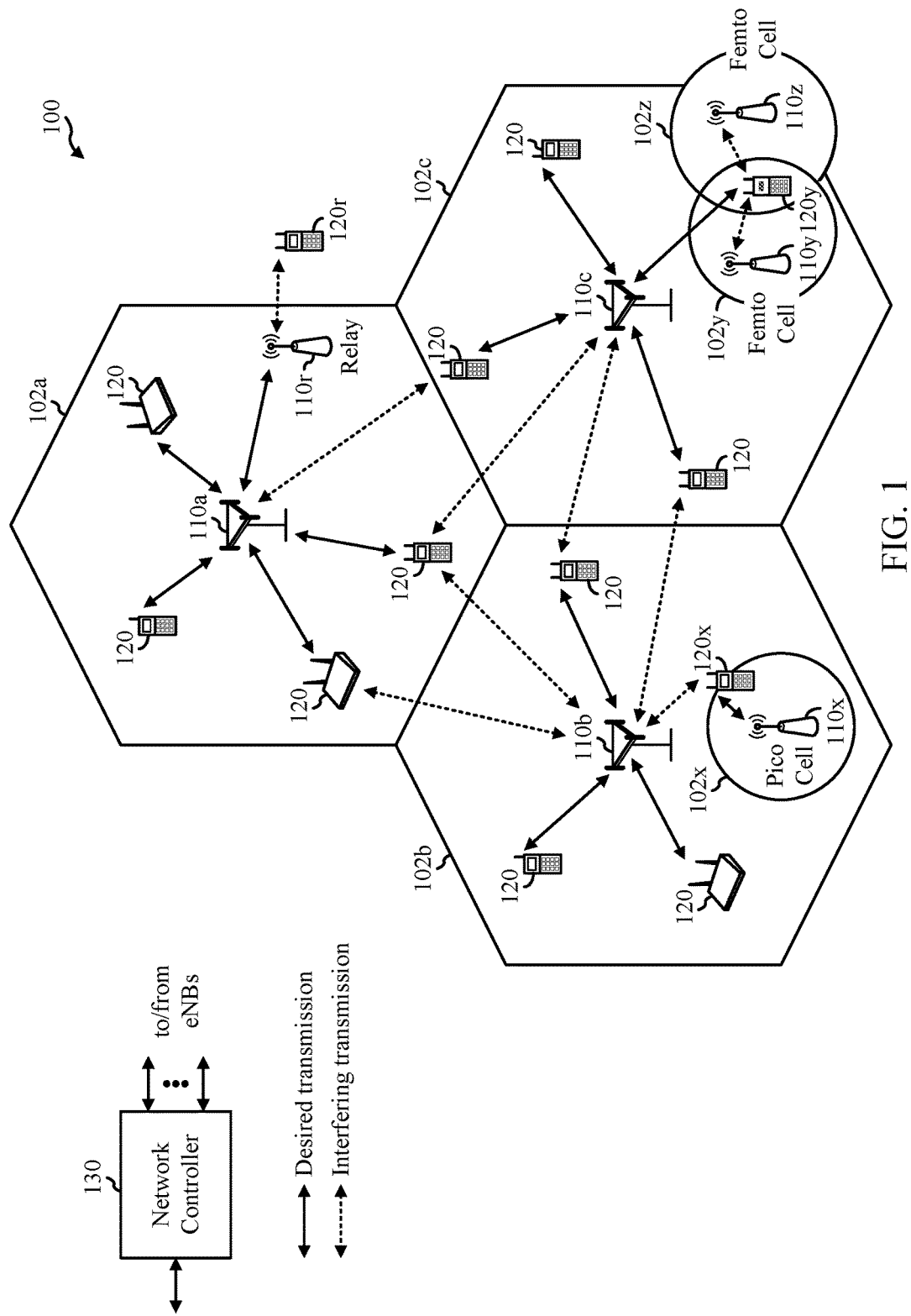
FIG. 1 is a block diagram conceptually illustrating an example telecommunications system, according to aspects of the present disclosure.

Aspects of the present disclosure provide apparatus, methods, processing systems, and computer program products for sounding reference signal (SRS) enhancements. More specifically, aspects of the present disclosure relate to determining/transmitting SRSs in different symbols of a subframe based on a location of a UE transmitting the SRS. For example, as will be described in further detail herein, a UE may receive information indicating a symbol, in a sub-frame of a radio frame used to communicate in a wireless network, for transmission of SRSs. According to certain aspects, a location of the symbol in the sub-frame is based, at least in part, on a location of the UE. The UE may then transmit the SRS in the symbol based on the received information.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

It is noted that while aspects may be described herein using terminology commonly associated with 3G and/or 4G wireless technologies, aspects of the present disclosure can be applied in other generation-based communication systems, such as 5G and later.

EXAMPLE WIRELESS COMMUNICATIONS SYSTEM

FIG. 1 shows a wireless communications network 100 in which aspects of the present disclosure may be practiced. For example, a UE 120 can receive information indicating a symbol, in a sub-frame of a radio frame used to communicate in the wireless communications network 100, for transmission of sounding reference signals (SRS). According to certain aspects, a location of the symbol in the sub-frame is based, at least in part, on a location of the UE. The UE 120 may then transmit the SRS in the symbol based on the received information.

The system illustrated in FIG. 1 may be, for example, a long term evolution (LTE) network. The wireless communications network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

According to certain aspects, the eNodeB 110 can determine a first symbol, in a sub-frame of a radio frame used to communicate in the wireless communications network 100, for transmission of SRS by a first group of UEs 120, wherein the determination of the first symbol is based, at least in part, on a location of each UE in the first group of UEs. Additionally, the eNodeB 110 can determine a second symbol, in the sub-frame, for transmission of SRSs by a second group of UEs 120, wherein the determination of the second symbol is based, at least in part, on a location of each UE in the second group of UEs. Further, the eNodeB 110 can transmit information to the first group of UEs and the second group of UEs indicating a location of the first symbol and the second symbol in the sub-frame.

The wireless communications network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless communications network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless communications network 100. For example, macro eNodeBs may have a high transmit power level (e.g., 20 Watts) whereas pico eNodeBs, femto eNodeBs and relays may have a lower transmit power level (e.g., 1 Watt).

The wireless communications network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 (e.g., 120x, 120y, etc.) may be dispersed throughout the wireless communications network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
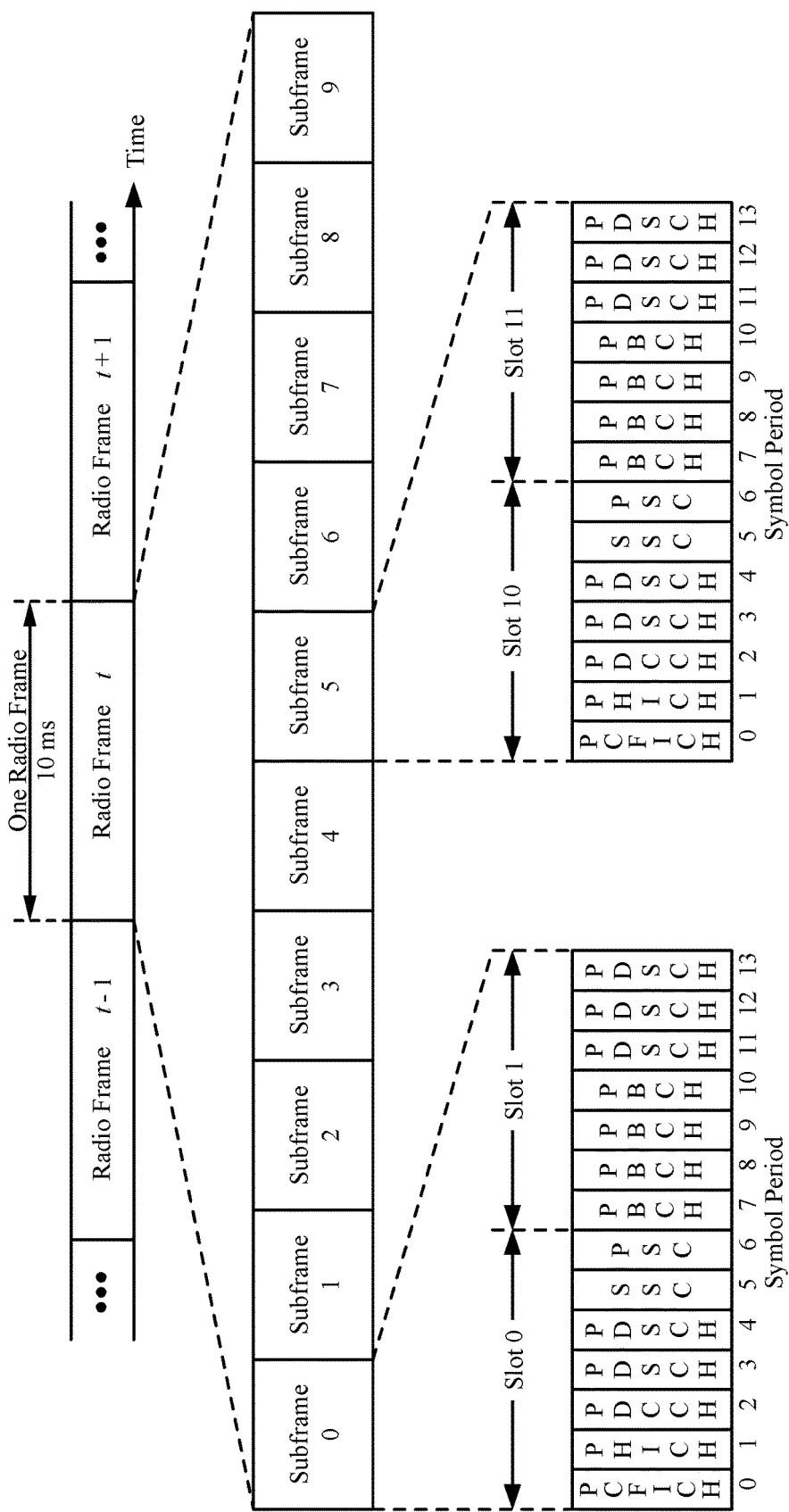
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of sub-frame 0. The PBCH may carry certain system information.

The eNodeB may send a Physical Control Format Indicator Channel (PCFICH) in a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
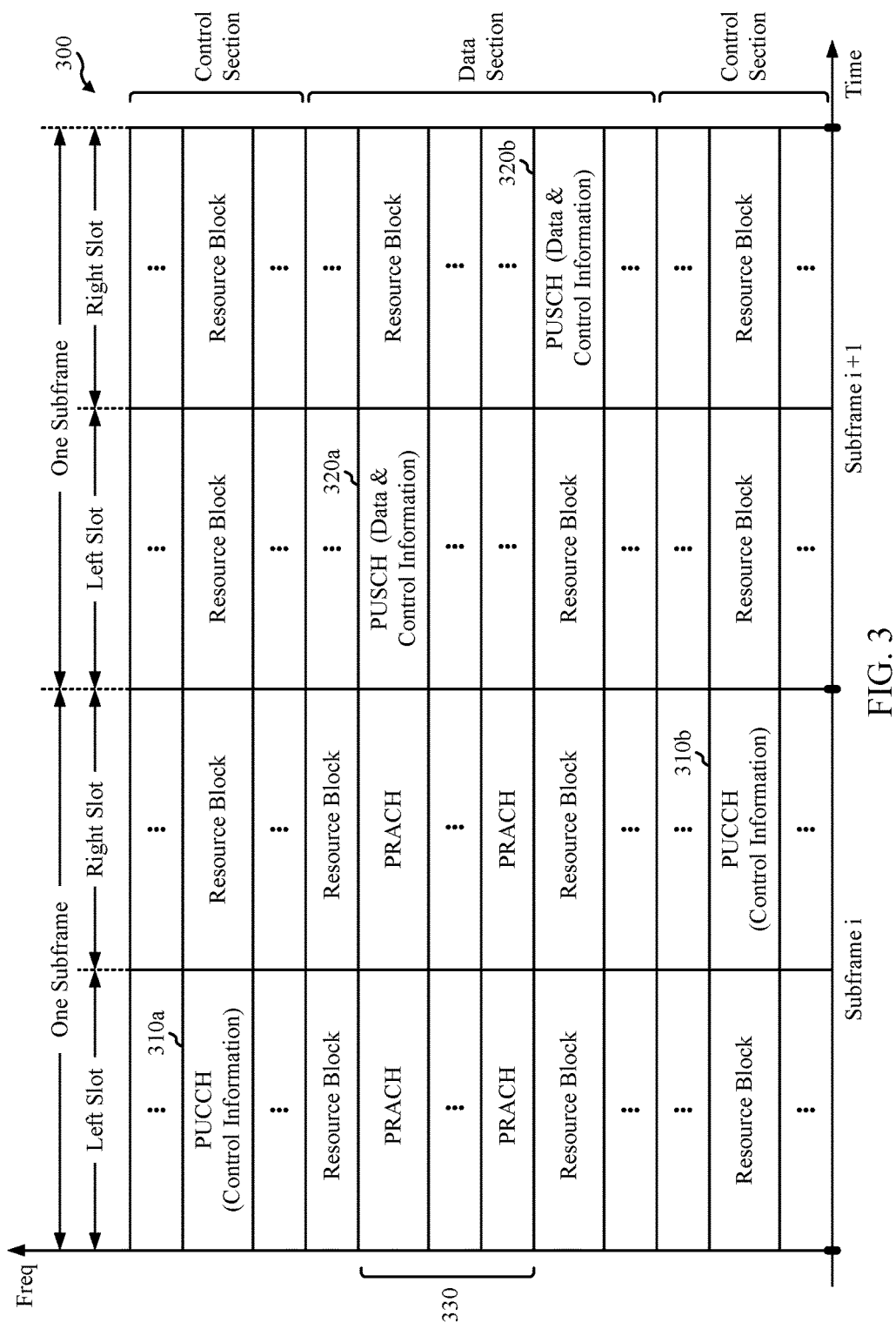
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to an eNB. The UE may also be assigned resource blocks 320a, 320b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 m) or in a sequence of few contiguous subframes and a UE can make a single PRACH attempt per frame (10 ms). In accordance with aspects of the present disclosure, one or more of the above-described resources may be allocated and/or employed in a different manner.

Figure 4:
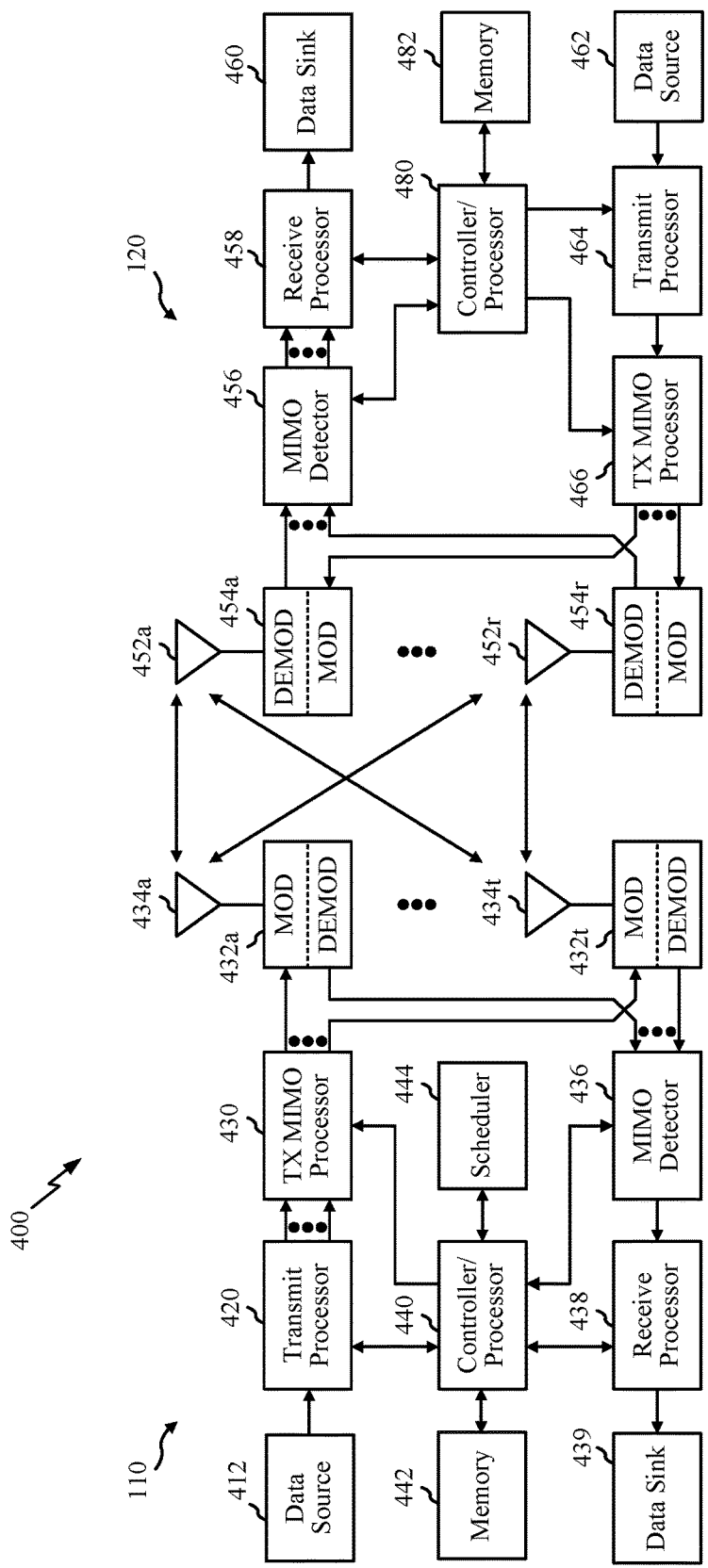
FIG. 4 is a block diagram conceptually illustrating a design of an example eNodeB and user equipment (UE), according to aspects of the present disclosure.

FIG. 4 shows a block diagram of a design of a eNodeB 110 and a UE 120, which may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may also be a base station of some other type. The eNodeB 110 may be equipped with antennas 434a through 434t, and the UE 120 may be equipped with antennas 452a through 452r.

At the eNodeB 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNodeB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNodeB 110. At the eNodeB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controller/processors 440 and 480 may direct the operation at the eNodeB 110 and the UE 120, respectively. The controller/processor 440 and/or other processors and modules at the eNodeB 110 may perform or direct, e.g., the execution of various processes for the techniques described herein, such as the functional blocks illustrated in FIG. 7. The controller/processor 480 and/or other processors and modules at the UE 120 may also perform or direct, e.g., the execution of various processes for the techniques described herein, such as the functional blocks illustrated in FIG. 8. The memories 442 and 482 may store data and program codes for the eNodeB 110 and the UE 120, respectively, for example, instructions/programs codes for carrying out the processes illustrated in the functional blocks of FIGS. 7 and 8. A scheduler 444 may schedule UEs for data transmission on the downlink and/or uplink.

Figure 5:
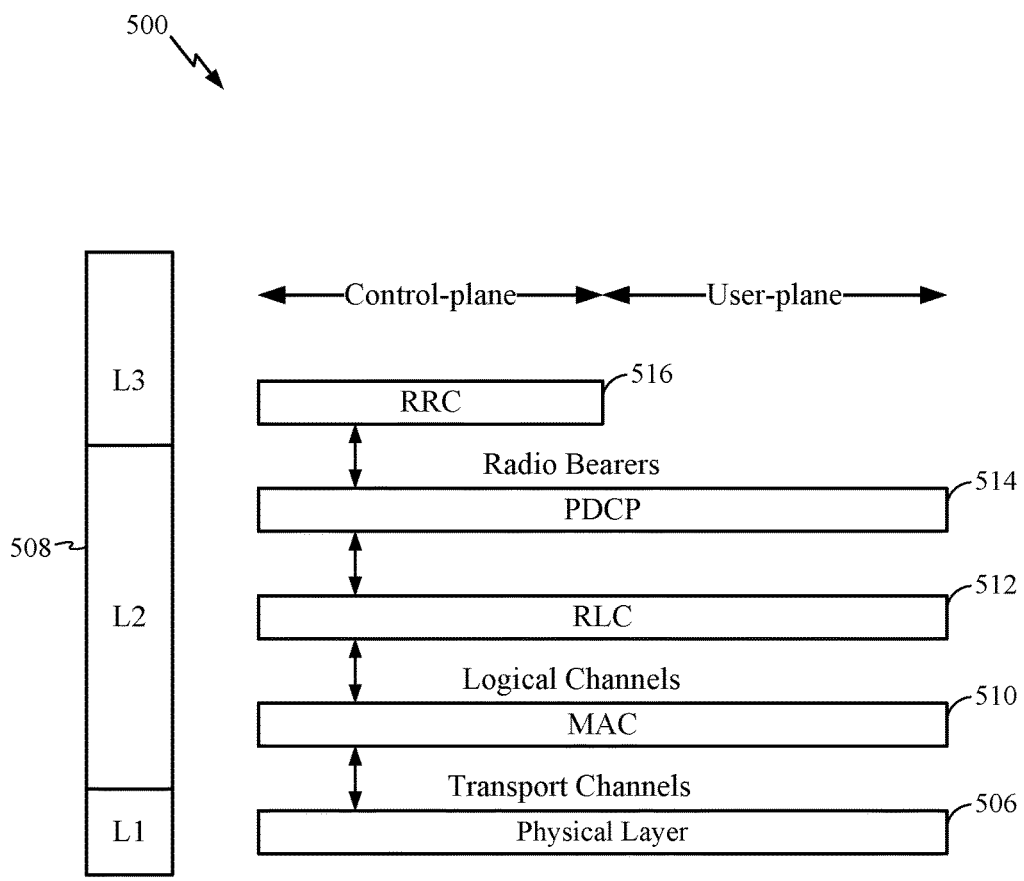
FIG. 5 is a diagram illustrating an example radio protocol architecture for the user and control planes, according to aspects of the present disclosure.

FIG. 5 is a diagram 500 illustrating an example of radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, for example, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
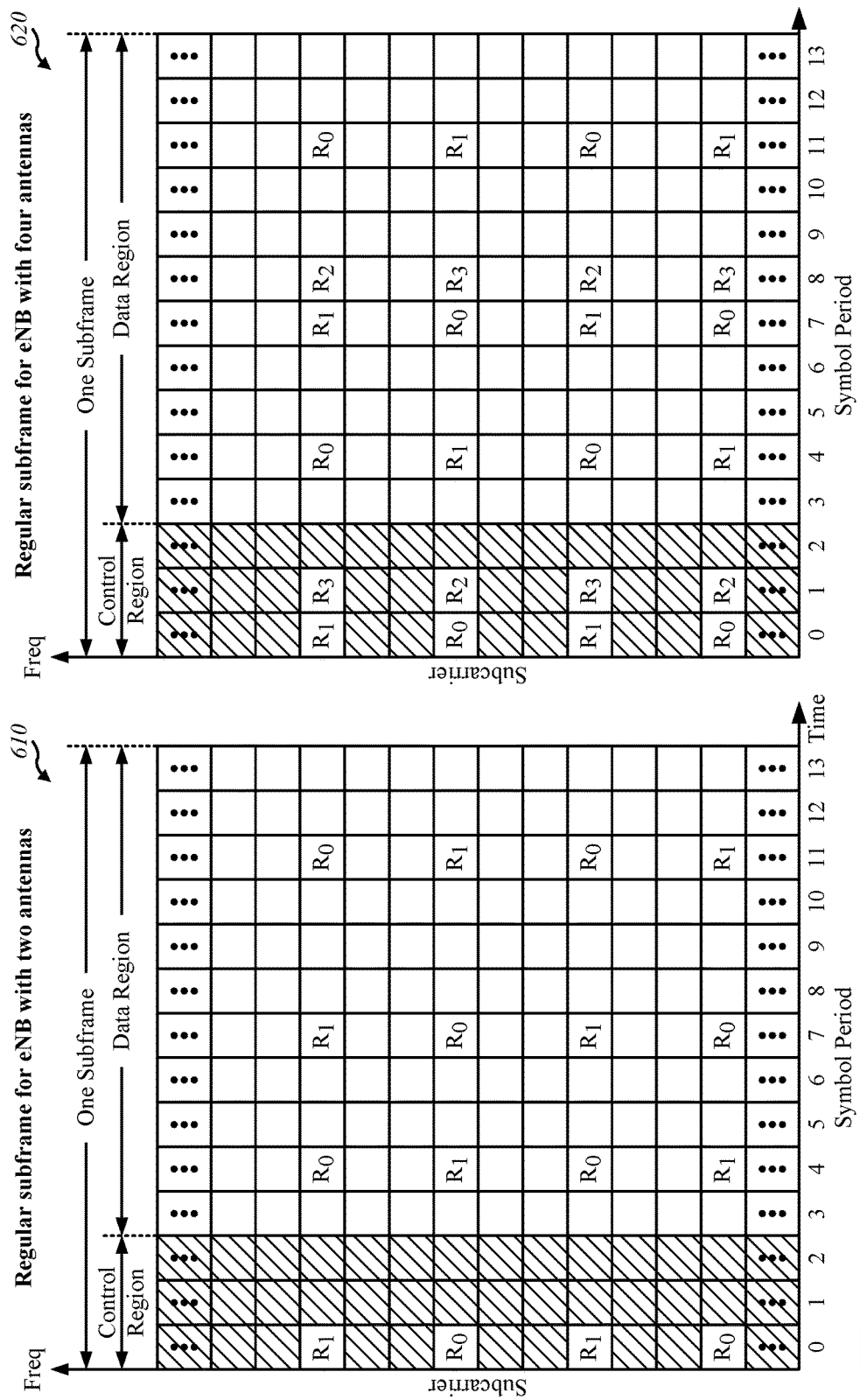
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different eNBs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available. In accordance with aspects of the present disclosure, one or more of the above-described resources may be allocated and/or employed in a different manner.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

EXAMPLE SOUNDING REFERENCE SIGNAL ENHANCEMENTS

In a wireless communication system, such as one described above, user equipments (UEs) may transmit sounding reference signals (SRSs) which are used by the evolved NodeBs (eNBs) to measure uplink channel quality. However, certain issues may exist with SRS transmission and reception in large cells, such as in rural areas, which, in some cases, contain both indoor and outdoor users. For example, UEs that are located outdoors in these large cells and that are traveling at speeds greater than 120 km/h may have lower processing gain on the UL for SRS (e.g., as there may not be inter-subframe averaging) and lower processing gain on the DL for demodulation reference signal (DMRS)/channel state information reference signal (CSI-RS). Additionally UEs that are located indoors may see less effect from Doppler (e.g., which represents an increase or decrease in the frequency of a wave (e.g., light, sound, etc.) as a source and an observer move closer to or farther away from each other) as opposed to outdoor UEs. However, indoor UEs may experience higher path loss on the UL than outdoor UEs, not only due to distance, but also due to additional penetration loss (e.g., up to 20 dB or more). As a result, a large number of indoor UEs may be power-limited on the UL due to the UEs reaching a maximum power while still not meeting target SNR requirements at the eNB, which adds to SRS performance loss. It should be noted that "outdoors" may refer to a location at which an uplink (UL) transmission by the UE is generally unobstructed (e.g., outdoors in an open area), while "indoors" may refer to a location at which a UL transmission by the UE is generally (highly) obstructed (e.g., inside a building or outdoors behind a large obstruction).

Thus, as can be seen, UL performance may be an issue for both indoor and outdoor UEs in rural areas. Accordingly, aspects of the present disclosure provide SRS enhancements to address the issues of UL performance. In one example, since indoor users may be power limited, indoor users may increase the number of SRS symbols used within a subframe to improve processing gain, which in turn may improve performance. In some cases, these extra symbols may be added to the center of the subframe for indoor users. In another example, for outdoor users, power may be boosted on the UL symbols (e.g., since outdoor users are not power limited), while the number of symbols remains the same.

Figure 7:
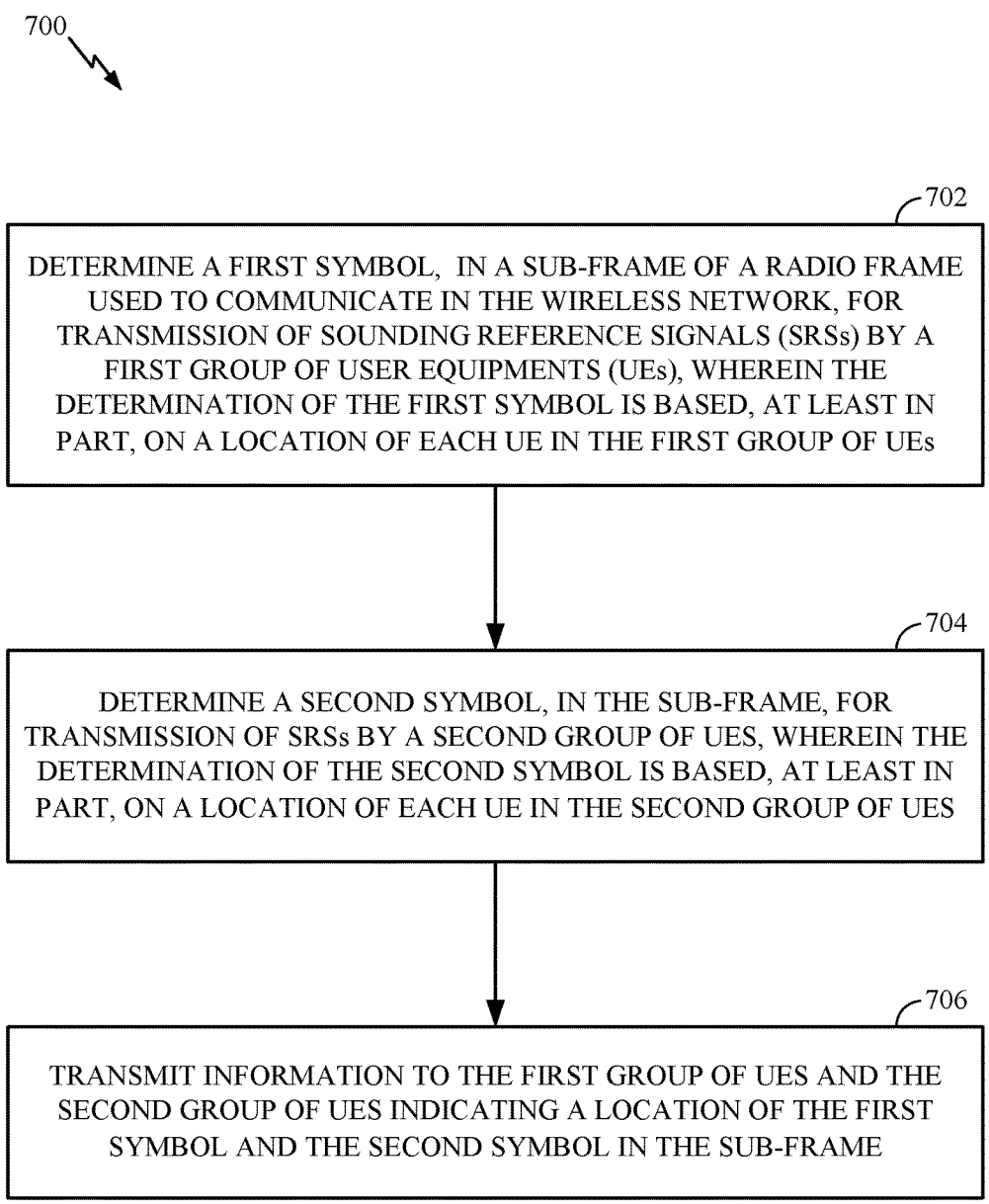
FIG. 7 is a block diagram illustrating example operations for wireless communications by a base station (BS), according to aspects of the present disclosure.

FIG. 7 illustrates example operations 700 for wireless communications in a wireless network. According to certain aspects, operations 700 may be performed by a base station (e.g., eNodeB 110).

According to certain aspects, the base station may include one or more components as illustrated in FIG. 4 that may be configured to perform the operations described herein. For example, the antenna 434, demodulator/modulator 432, controller/processor 440, and/or memory 442 as illustrated in FIG. 4 may perform the operations described herein.

Operations 700 begin at 702 with the base station determining a first symbol, in a sub-frame of a radio frame used to communicate in the wireless network, for transmission of sounding reference signals (SRS) by a first group of UEs, wherein the determination of the first symbol is based, at least in part, on a location of each UE in the first group of UEs. At 704, the base station determines a second symbol, in the sub-frame, for transmission of SRSs by a second group of UEs, wherein the determination of the second symbol is based, at least in part, on a location of each UE in the second group of UEs. At 706, the base station transmits information to the first group of UEs and the second group of UEs indicating a location of the first symbol and the second symbol in the sub-frame.

Figure 8:
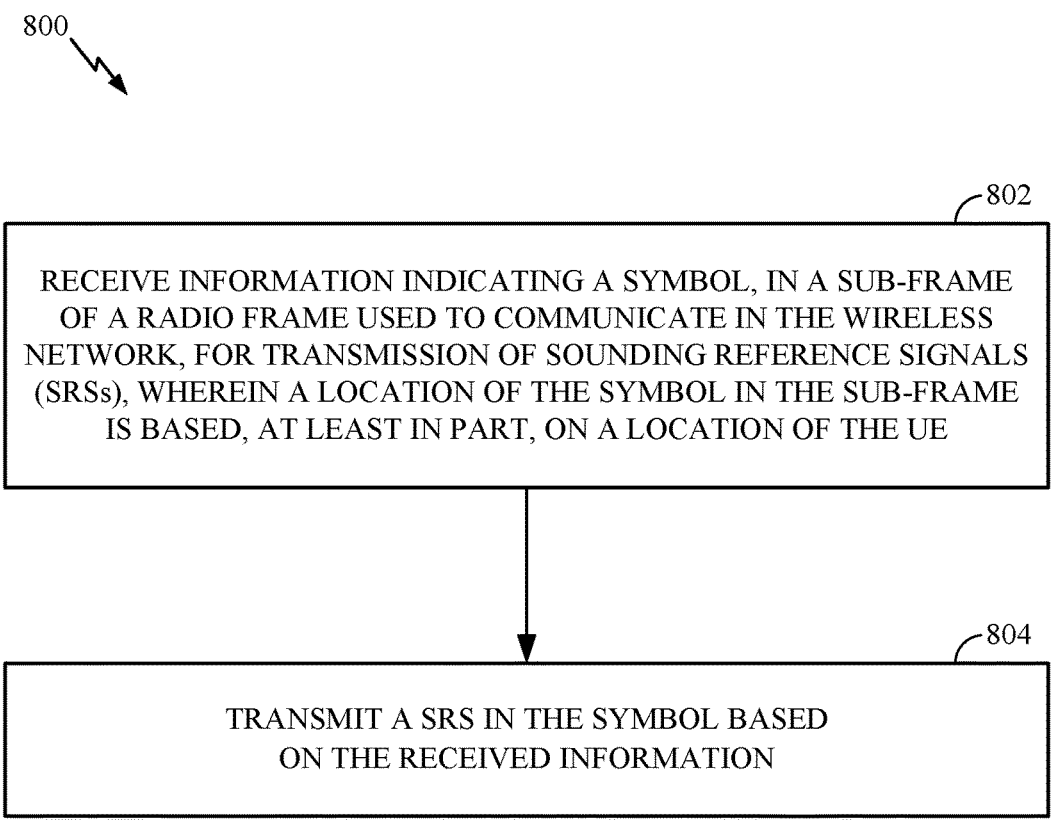
FIG. 8 is a block diagram illustrating example operations for wireless communications by a user equipment (UE), according to aspects of the present disclosure.

FIG. 8 illustrates example operations 800 for wireless communications in a wireless network. According to certain aspects, operations 800 may be performed by a user equipment (e.g., UE 120).

According to certain aspects, the UE may include one or more components as illustrated in FIG. 4 that may be configured to perform the operations described herein. For example, the antenna 452, demodulator/modulator 454, controller/processor 480, and/or memory 482 as illustrated in FIG. 4 may perform the operations described herein.

Operations 800 begin at 802 with the user equipment receiving information indicating: a first symbol, in a sub-frame of a radio frame used to communicate in the wireless network, for transmission of sounding reference signals (SRS) by a first group of UEs, wherein a location of the first symbol in the sub-frame is based, at least in part, on a location of each UE in the first group of UEs, and a second symbol, in the sub-frame, for transmission of SRSs by a second group of UEs, wherein a location of the second symbol in the sub-frame is based, at least in part, on a location of each UE in the second group of UEs. At 804, the user equipment transmits a SRS in the first symbol or the second symbol based, at least in part, on a location of the user equipment.

As noted above, in large cells, both outdoor and indoor UEs usually suffer poor quality channel estimation on UL. For example, indoor UEs may be power-limited, while outdoor UEs may see high Doppler, reducing processing gain from inter-subframe averaging. One way to help resolve these issues, at least for UEs located outdoors, may be to have these UEs perform power boosting when transmitting SRSs. However, power boosting by UEs located outdoors may adversely affect the signal-to-interference-plus-noise ratio (SINR) of UEs located indoors. Thus, one way, as noted above, to resolve these issues may be to separate UEs located outdoors from UEs located indoors and have each transmit SRSs in a different symbol.

Figure 9:
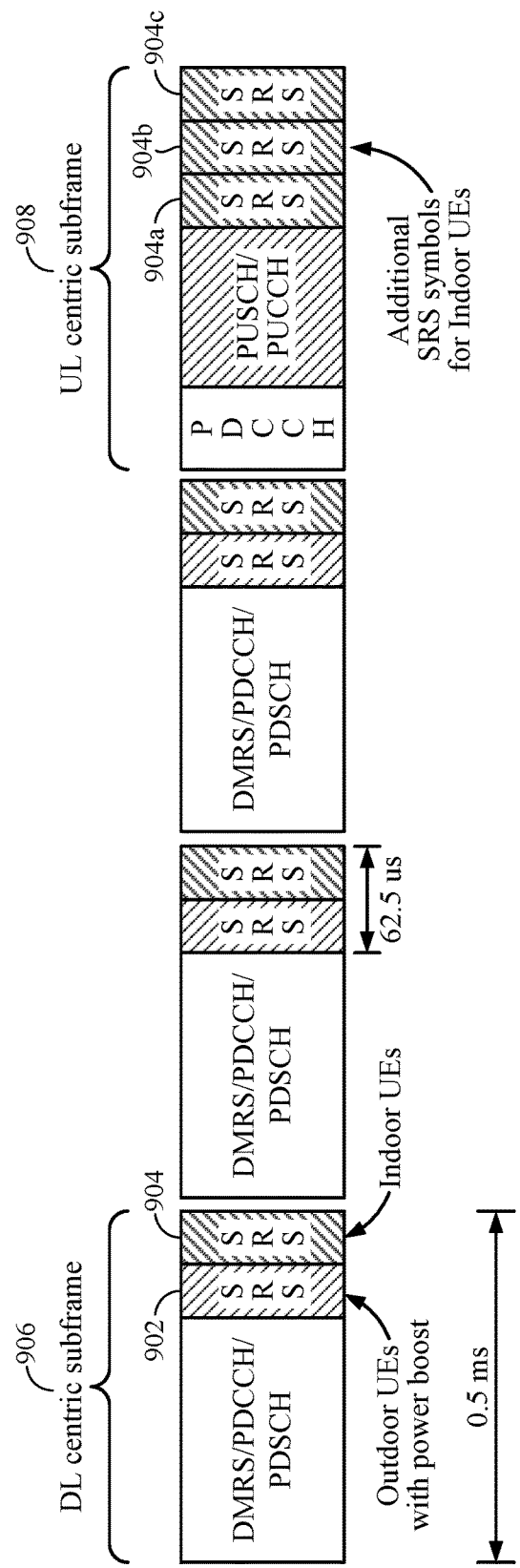
FIG. 9 illustrates an example frame structure for wireless communications, in accordance with certain aspects of the present disclosure.

For example, as illustrated in FIG. 9, the base station may determine a first symbol 902 in a sub-frame 906 for transmission of SRSs by UEs that are located outdoors and determine a different, second symbol 904 in the sub-frame 906 for transmission of SRSs by UEs that are located indoors. In some cases, for example as illustrated in FIG. 9, the location of the first symbol may be adjacent to the second symbol. According to certain aspects, the base station may then transmit information to the first group of UEs and the second group of UEs indicating a location of the first symbol and the second symbol in the subframe. In some cases, this information may comprise scheduling information indicating when/where each UE is scheduled to transmit an SRS and may be transmitted in a same or different subframe in which the SRSs are to be transmitted.

According to certain aspects, a UE may receive this information and transmit a SRS in the first symbol or the second symbol, for example, based, at least in part, on a location of the UE. For example, when the UE is located outdoors, the UE may transmit a SRS in the first symbol 902, while when the UE is located indoors, the UE may transmit a SRS in the second symbol 904. The way in which a UE determines its location (e.g., whether indoors or outdoors) is explained in greater detail below.

Figure 10:
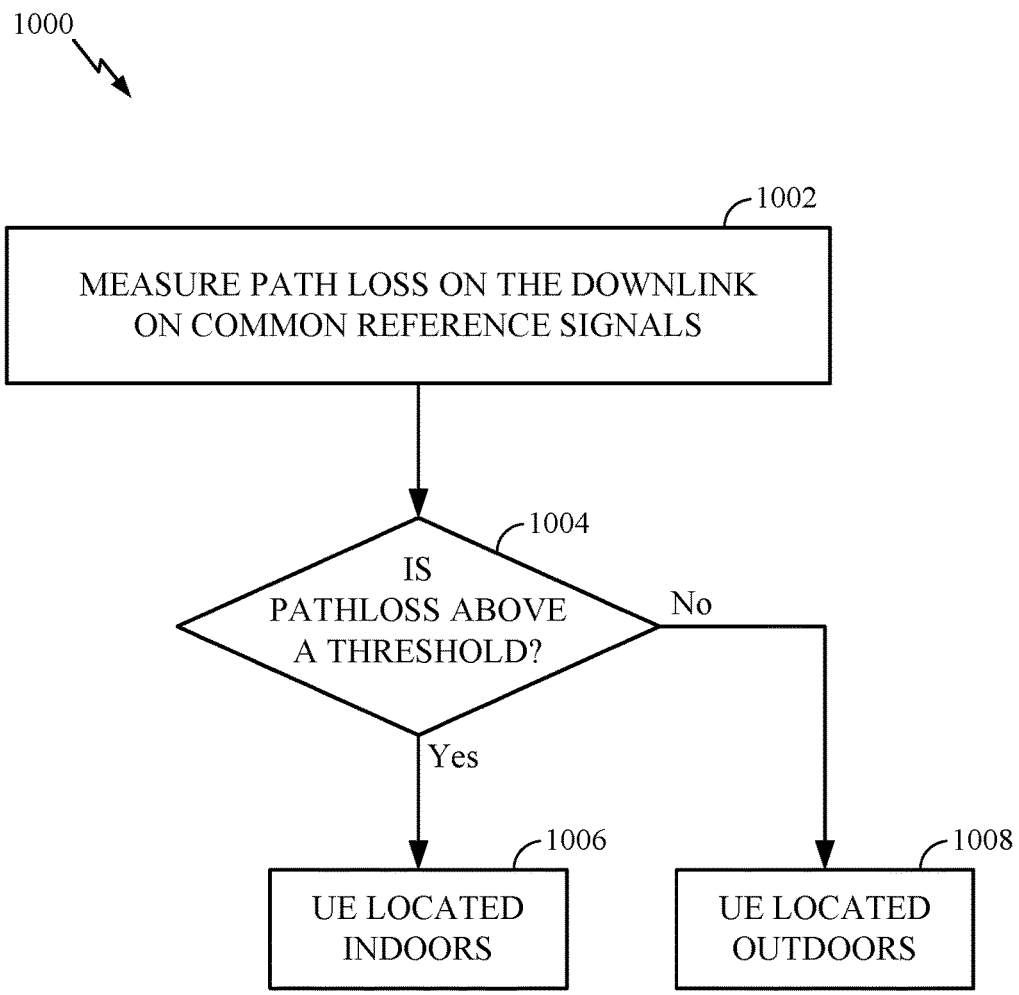
FIGS. 10, 11 and 12 illustrate flowcharts containing steps for determining whether a UE is located indoors or outdoors, in accordance with certain aspects of the present disclosure.

For example, according to certain aspects, there may be different ways for determining whether a UE is located indoors or outdoors. For example, in one case as illustrated in FIG. 10, at 1002, a UE may measure path loss on the downlink on common reference signals transmitted by the base station and may make an inference as to whether the UE is located indoors or outdoors based on the path loss. For example, at 1004, if the UE determines that the path loss is high (e.g., above a certain threshold, taking into account a target SNR on the UL for SRS and pathloss compensation factors) based on the common reference signals, the UE may make the determination at 1006 that it is located indoors, whereas if the path loss is below the threshold, the UE may make the determination at 1008 that it is located outdoors. In either case, the UE may provide the base station with information indicating the location of the UE (e.g., outdoors/indoors). This information may include a specific indication of the UEs location or may include the path loss measurements, for example, which could be used by the base station to make the inference of location of the UE (e.g., based on the threshold described above).

Figure 11:
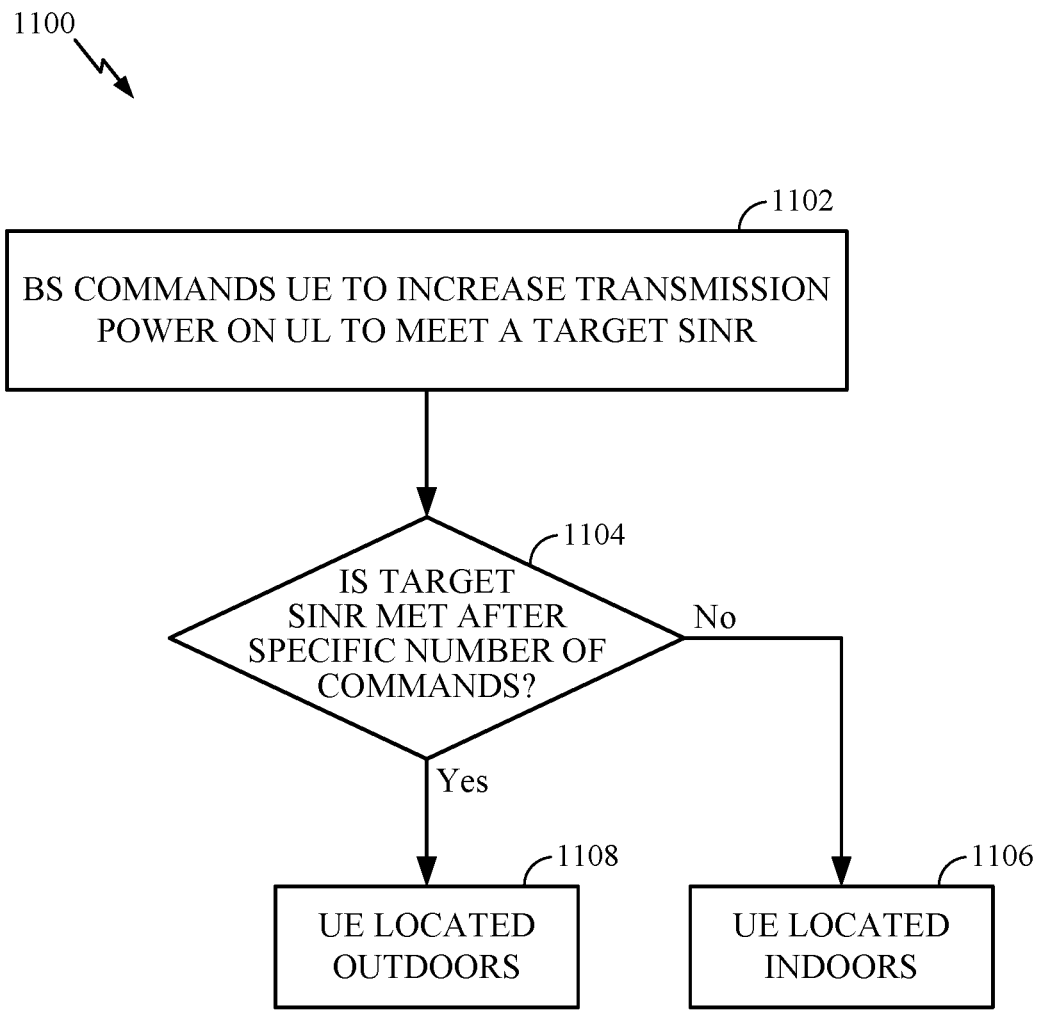

Another way to determine whether a UE is located indoors or outdoors, for example, as illustrated in FIG. 11, involves the base station repeatedly commanding a particular UE to increase its transmission power on the UL to meet a target SINR, for example, at 1102. According to certain aspects, if the UE is located indoors (e.g., power-limited) at a certain point, no matter how many commands to increase transmission power the UE receives, the UE may never be able to meet the target SINR (e.g., due to the penetration loss of being located indoors). For example, if, after a threshold number of power-boosting commands have been sent by the base station, the base station determines at 1104 that the UE is unable to meet the target SINR, the base station may make the inference at 1106 that the UE is located indoors, whereas if the base station determines at 1104 that the UE is able to meet the target SINR, the base station may make the inference at 1108 that the UE is located outdoors.

Figure 12:
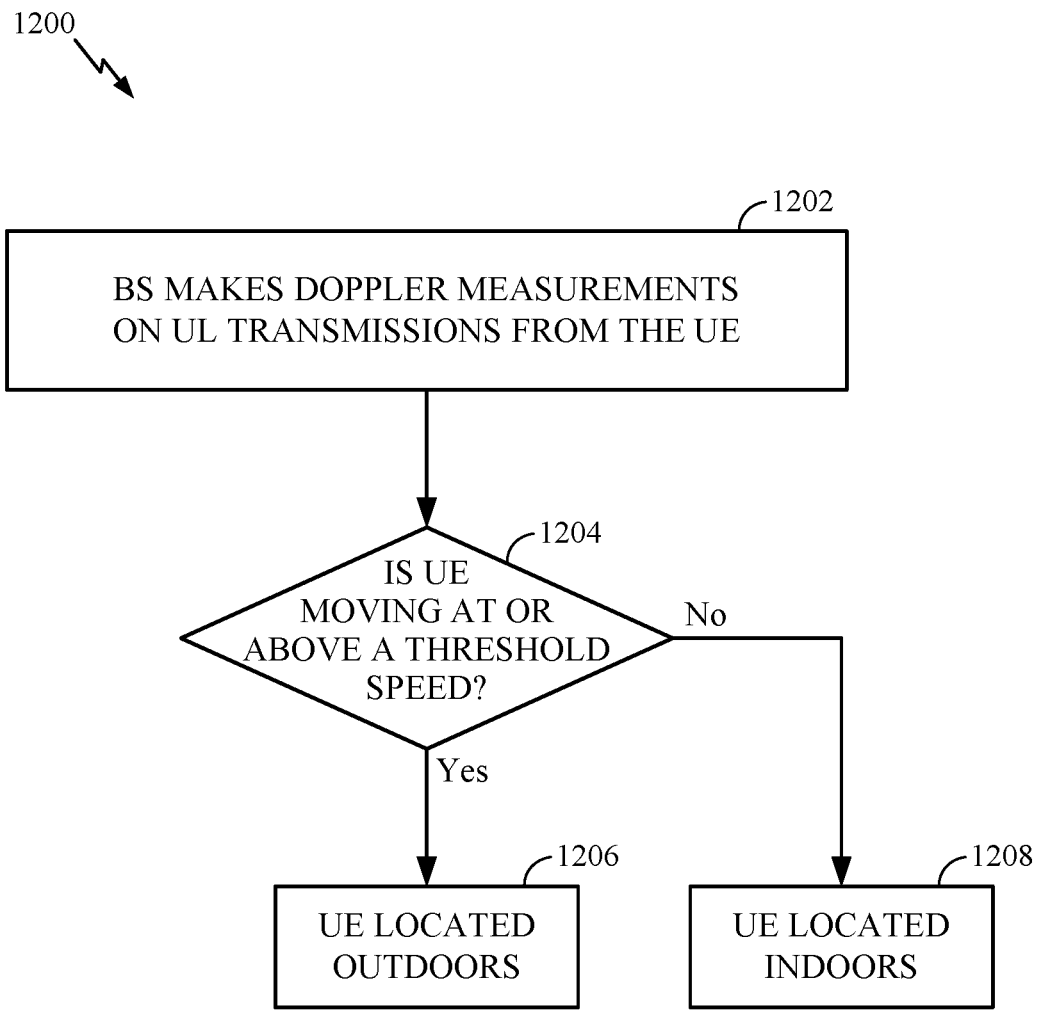

An additional way to determine whether a UE is located indoors or outdoors, for example, as illustrated in FIG. 12, may be to detect Doppler associated with uplink and/or downlink transmissions. For example, at 1202 base station may make Doppler measurements on the UL transmission from the UE (e.g., rate of change of UL channel phase over time) and may determine at 1204 that the Doppler corresponds to a UE that is moving at or above a particular speed or threshold speed (e.g., a speed that is impossible or impractical for UEs located indoors, e.g., greater than or equal to 120 km/h). Based on the Doppler measurements, the base station may make the inference at 1206 that the UE is located outdoors. If the UE is not moving at or above threshold speed (e.g., based/determined from the Doppler measurements), the base station makes the inference at 1208 that the UE is located indoors. Further, a UE may make similar Doppler measurements based on downlink transmissions from the base station (e.g., rate of change of DL channel phase over time) and may make the inference of whether the UE is located indoors or outdoors in a similar manner based on the Doppler measurements.

It should be noted that, while the above illustrates some ways of determine whether a UE is located indoors or outdoors, other ways may exist (e.g., using GPS). According to aspects, the base station may then use the location information of the UE(s) when determining the symbols in which to schedule SRSs, as explained above.

According to certain aspects, because the symbols in which SRSs are transmitted by UEs located outdoors are separated from the symbols in which SRSs are transmitted by UEs located indoors, the UEs located outdoors may perform power boosting while transmitting SRSs without adversely affecting the SINR for UEs located indoors. Thus, according to certain aspects, the base station may transmit information to UEs located outdoors instructing these UEs to perform power boosting when transmitting SRSs in the first symbol. According to certain aspects, performing power boosting (e.g., increasing the transmission power) when transmitting SRSs may help alleviate the potential issues related to high Doppler for outdoor UEs.

However, while separating the symbols in which indoor UEs transmit SRSs from the symbols in which outdoor UEs transmit SRSs may prevent adversely affecting the SINR of indoor UEs, power-limited indoor UEs may still observe issues with SRS processing gain due to path-loss and penetration loss (e.g., due to only having a single symbol to transmit an SRS). One way to help alleviate this issue may be to provision/schedule additional symbols for transmission of SRSs by UEs located indoors. For example, as illustrated in FIG. 9, in some cases, the base station may determine one or more additional symbols (e.g., 904*a*, 904*b*, and 904*c*) in an additional sub-frame 908 for transmission of SRSs by UEs located indoors. The scheduling information noted above that is transmitted from the base station to the UEs may therefore include a location for each additional symbol in the additional sub-frame 908 for use by UEs located indoors when transmitting SRSs. According to certain aspects, the additional sub-frame 908 may comprise a UL-centric subframe, which comprises more symbols designated for uplink than symbols designated for downlink. As an UL-centric subframe comprises more symbols for UL than DL, the base station may "borrow" some of these symbols for transmission of SRSs. A UE may receive this information indicating additional symbols for transmitting SRS and may transmit additional SRSs in these additional symbols of the additional sub-frame 908.

According to certain aspects, transmitting SRSs in multiple symbols may allow the base station to perform energy accumulation across these additional symbols to combat the adverse effects of penetration loss seen at UEs located indoors. That is, a base station may accumulate the energy received across each of these additional symbols in order to more reliably receive the SRS, which may otherwise not be recoverable due to penetration loss.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for providing an indication, and/or means for providing a location may comprise a processing system, which may include one or more processors, such as the controller/processor 480 of the user equipment 120, and/or the controller/processor 440 of the eNodeB 110 illustrated in FIG. 4. Additionally, means for transmitting, means for receiving, means for providing and indication, and/or means for providing a location may comprise one or more antennas, such as the antennas 434 of the eNodeB 110 and or antennas 452 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications in a wireless network, comprising:
    repeatedly transmitting commands to a plurality of user equipments (UEs) to perform power boosting while transmitting uplink transmissions;
    determining a first symbol location in a sub-frame for transmission of sounding reference signals (SRSs) by a first group of UEs of the plurality of UEs, wherein the first symbol location in the sub-frame is based, at least in part, on a first Doppler characteristic of each UE in the first group of UEs and a uplink signal-to-interference-plus-noise ratio (SINR) of each UE in the first group of UEs in response to a threshold number of the repeatedly transmitted commands to perform the power boosting;
    determining a second symbol location in the sub-frame for transmission of the SRSs by a second group of UEs of the plurality of UEs, wherein the second symbol location in the sub-frame is based, at least in part, on a second Doppler characteristic of each UE in the second group of UEs and an uplink SINR of each UE in the second group of UEs in response to the threshold number of the repeatedly transmitted commands to perform the power boosting; and
    transmitting information to the first group of UEs and the second group of UEs indicating the first symbol location and the second symbol location in the sub-frame, wherein the first symbol location and the second symbol location are different.

2. The method of claim 1, further comprising providing an indication to the first group of UEs instructing the first group of UEs to perform the power boosting when transmitting the SRSs.

3. The method of claim 1, further comprising determining one or more additional symbol locations in the sub-frame for transmission of the SRSs by the second group of UEs, wherein the information further comprises an indication of the additional symbol locations in the sub-frame.

4. The method of claim 3, wherein the sub-frame comprises an uplink-centric sub-frame comprising more symbols designated for uplink than symbols designated for downlink.

5. The method of claim 1, further comprising receiving information indicative of the first Doppler characteristic of at least a first UE in the first group of UEs or the second Doppler characteristic of at least a second UE in the second group of UEs.

6. The method of claim 1, further comprising at least one of:
   determining the first Doppler characteristic of each UE in the first group of UEs; or
   determining the second Doppler characteristic of each UE in the second group of UEs.

7. The method of claim 1, wherein at least one of:
   determining the first Doppler characteristic based, at least in part, on first Doppler measurements performed on uplink transmissions from each UE in the first group of UEs; or
   determining the second Doppler characteristic based, at least in part, on second Doppler measurements performed on uplink transmissions from each UE in the second group of UEs.

8. The method of claim 1, further comprising determining UEs of the plurality of UEs that do satisfy a particular uplink SINR to be part of the first group of UEs and UEs of the plurality of UEs that do not satisfy the particular uplink SINR to be part of the second group of UEs.

9. A method of wireless communications in a wireless network by a user equipment (UE), comprising:
   receiving a threshold number of commands to perform power boosting while transmitting uplink transmissions;
   receiving information indicating a symbol location in a sub-frame for transmission of at least one sounding reference signal (SRS), wherein the symbol location in the sub-frame is based, at least in part, on a Doppler characteristic of the UE and an uplink signal-to-interference-plus-noise ratio (SINR) associated with the UE in response to receiving the threshold number of commands to perform the power boosting; and
   transmitting the at least one SRS in the symbol location based on the received information.

10. The method of claim 9, wherein:
   a condition of the UE is high mobility; and
   based on the high mobility condition, the symbol location comprises a first symbol location in the sub-frame different from a second symbol location in the sub-frame for use by another UE with a low mobility condition.

11. The method of claim 10, further comprising receiving an indication instructing the UE to perform the power boosting when transmitting the at least one SRS in the first symbol location.

12. The method of claim 9, wherein:
   a condition of the UE is low mobility; and
   based on the low mobility condition, the symbol location comprises a second symbol location in the sub-frame different from a first symbol location in the sub-frame for use by another UE with a high mobility condition.

13. The method of claim 12, further comprising receiving information indicating additional symbol locations in the sub-frame in which to transmit the at least one SRS.

14. The method of claim 13, wherein transmitting comprises transmitting the at least one SRS in the second symbol location and the additional symbol locations.

15. The method of claim 14, wherein the sub-frame comprises an uplink-centric sub-frame comprising more symbols designated for uplink than symbols designated for downlink.

16. The method of claim 9, further comprising determining the Doppler characteristic of the UE.

17. The method of claim 16, wherein determining the Doppler characteristic of the UE is based on at least one of path loss measurements of common reference signals or Doppler measurements performed on downlink transmissions.

18. The method of claim 17, further comprising providing an indication of the Doppler characteristic of the UE to a base station.

19. The method of claim 11, wherein:
   the symbol location comprises a first symbol in the sub-frame when, based on the threshold number of commands to perform the power boosting, the uplink SINR associated with the UE satisfies a particular uplink SINR; and
   the symbol location comprises a second symbol in the sub-frame when, based on the threshold number of commands to perform the power boosting, the uplink SINR associated with the UE does not satisfy the particular uplink SINR.

20. An apparatus for wireless communications in a wireless network, comprising:
   at least one processor configured to:
      repeatedly transmit commands to a plurality of user equipments (UEs) to perform power boosting while transmitting uplink transmissions;
      determine a first symbol location in a sub-frame for transmission of sounding reference signals (SRSs) by a first group of UEs of the plurality of UEs, wherein the first symbol location in the sub-frame is based, at least in part, on a first Doppler characteristic of each UE in the first group of UEs and a uplink signal-to-interference-plus-noise ratio (SINR) of each UE in the first group of UEs in response to a threshold number of the repeatedly transmitted commands to perform the power boosting;
      determine a second symbol location in the sub-frame for transmission of the SRSs by a second group of UEs of the plurality of UEs, wherein the second symbol location in the sub-frame is based, at least in part, on a second Doppler characteristic of each UE in the second group of UEs and an uplink SINR of each UE in the second group of UEs in response to the threshold number of the repeatedly transmitted commands to perform the power boosting; and
   a memory coupled with the at least one processor; and
   a transmitter configured to transmit information to the first group of UEs and the second group of UEs indicating the first symbol location and the second symbol location in the sub-frame, wherein the first symbol location and the second symbol location are different.

21. The apparatus of claim 20, wherein the at least one processor is further configured to determine at least one of:
   the first Doppler characteristic of each UE in the first group of UEs; or
   the second Doppler characteristic of each UE in the second group of UEs.

22. The apparatus of claim 20, wherein at least one of:
   the at least one processor is configured to determine the first Doppler characteristic based, at least in part, on first Doppler measurements performed on uplink transmissions from each UE in the first group of UEs; or
   the at least one processor is configured to determine the second Doppler characteristic based, at least in part, on second Doppler measurements performed on uplink transmissions from each UE in the second group of UEs.

23. The apparatus of claim 21, wherein the at least one processor is configured to determine UEs of the plurality of UEs that do satisfy a particular uplink SINR to be part of the first group of UEs and UEs of the plurality of UEs that do not satisfy the particular uplink SINR to be part of the second group of UEs.

24. The apparatus of claim 20, wherein the at least one processor is further configured to receive information indicative of at least one of:
the first Doppler characteristic of at least a first UE in the first group of UEs; or
the second Doppler characteristic of at least a second UE in the second group of UEs.

25. An apparatus for wireless communications in a wireless network by a user equipment (UE), comprising:
at least one processor configured to:
receive a threshold number of commands to perform power boosting while transmitting uplink transmissions;
receive information indicating a symbol location in a sub-frame for transmission of at least one sounding reference signal (SRS), wherein the symbol location in the sub-frame is based, at least in part, on a Doppler characteristic of the UE and an uplink signal-to-interference-plus-noise ratio (SINR) associated with the UE in response to receiving the threshold number of commands to perform the power boosting;
a memory coupled with the at least one processor; and
a transmitter configured to transmit the at least one SRS in the symbol location based on the received information.

26. The apparatus of claim 25, wherein:
a condition of the UE is high mobility; and
based on the high mobility condition, the symbol location comprises a first symbol location in the sub-frame different from a second symbol location in the sub-frame for use by another UE with a low mobility condition.

27. The apparatus of claim 25, wherein:
a condition of the UE is low mobility;
based on the low mobility condition, the symbol location comprises a second symbol location in the sub-frame different from a first symbol location in the sub-frame for use by another UE with a high mobility condition;
the at least one processor is further configured to receive information indicating additional symbol locations in the sub-frame in which to transmit the at least one SRS; and
the transmitter is configured to transmit the at least one SRS by transmitting the at least one SRS in the additional symbol locations.

28. The apparatus of claim 25, wherein the at least one processor is configured to determine the Doppler characteristic of the UE based on at least one of path loss measurements of common reference signals or Doppler measurements performed on downlink transmissions.

* * * * *